United States Patent
Hennen

[15] 3,701,239
[45] Oct. 31, 1972

[54] HARVESTING MACHINE
[72] Inventor: John Joseph Hennen, Ottumwa, Iowa
[73] Assignee: Deere & Company, Moline, Ill.
[22] Filed: Oct. 12, 1971
[21] Appl. No.: 188,217

[52] U.S. Cl. ..................................56/13.5, 130/27 T
[51] Int. Cl. ............................................A01d 45/02
[58] Field of Search............56/13.5, 14.3, 14.4, 14.5, 56/14.6, 14.9, 15.3, 15.9, 16.4, 16.6; 130/27 T, 24

[56] References Cited

UNITED STATES PATENTS

| | | |
|---|---|---|
| 2,445,162 | 7/1948 | Wallace......................56/16.4 |
| 2,510,325 | 6/1950 | Anderson....................56/16.4 |
| 3,589,111 | 6/1971 | Gulickson et al...........56/14.6 |

*Primary Examiner*—Antonio F. Guida
*Attorney*—H. Vincent Harsha et al.

[57] ABSTRACT

A drive arrangement for a self-propelled forage harvester having a forwardly mounted transverse cutterhead, a side mounted blower fan rotatable about a transverse axis, and a rear mounted engine, the drive including a transverse shaft driven by the engine and extending axially through and driving the blower fan. The outer end of the shaft is drivingly connected with the cutterhead shaft by means of a longitudinally extending endless flexible drive element.

16 Claims, 2 Drawing Figures

INVENTOR.
JOHN J. HENNEN

BY John O. Hayes
ATTORNEY

INVENTOR.
JOHN J. HENNEN

BY

John O. Hayes
ATTORNEY

HARVESTING MACHINE

BACKGROUND OF THE INVENTION

The present invention relates generally to harvesting machinery and more particularly to a drive arrangement for a self-propelled forage harvester.

The engine on a self-propelled forage harvester, in addition to supplying the locomotive force for the vehicle, must also supply operating power to the numerous components comprising the harvesting mechanism contained thereon. Included among these components are the header unit which gathers the crop and severs it from the field, the cutterhead which chops or reduces the crop, the feed mechanism which transfers the crop from the header to the cutterhead, the blower unit which delivers the chopped material to a remote storage container, and the conveyor which moves the chopped material from the cutterhead to the blower unit. Due to the large number of these components, their varying power and speed requirements, and their physical arrangement and interrelationship on the harvester, it will be appreciated that a substantial problem exists in transmitting power from the engine to each of the components in a simple and efficient manner.

SUMMARY OF THE INVENTION

Accordingly, it is a primary object of the present invention to provide a drive arrangement for the various operating components on a self-propelled forage harvester, which arrangement results in a simple, efficient, and economical transfer of power from the main drive engine to the driven components. It is a more particular object to provide such a drive arrangement wherein the blower unit fan shaft serves also as means for transmitting power from the engine to the blower and cutterhead units.

The invention comprises, generally, a longitudinally extending mobile frame structure, a transverse cutterhead mounted forwardly on the frame, an engine mounted rearwardly on the frame substantially in fore-and-aft alignment with the cutterhead and having a forwardly extending output shaft, and a blower unit mounted between the cutterhead and the engine and toward one side of the frame structure, the blower unit including a fan rotatable about an axis parallel with the axis of the cutterhead. A power-shaft, which extends axially through the blower unit and serves as the fan support shaft, is connected at its inner end through a clutch mechanism to the engine output shaft. The outer end of the shaft is provided with a circular drive element lying in longitudinal alignment with a similar element on one end of the cutterhead drive shaft, and a longitudinally extending endless flexible element drivingly connects the two circular elements, thereby transmitting power from the engine to the cutterhead. The opposite end of the cutterhead shaft drives the conveyor which moves the crop material from the cutterhead to the blower and in addition serves as the input shaft of a change speed transmission, the latter having output shafts which drive the feed roll and header components.

BRIEF DESCRIPTION OF THE DRAWINGS

The preferred embodiment of the present invention will be described in conjunction with the accompanying drawings in which.

DESCRIPTION OF THE PREFERRED EMBODIMENT

Figure 1:
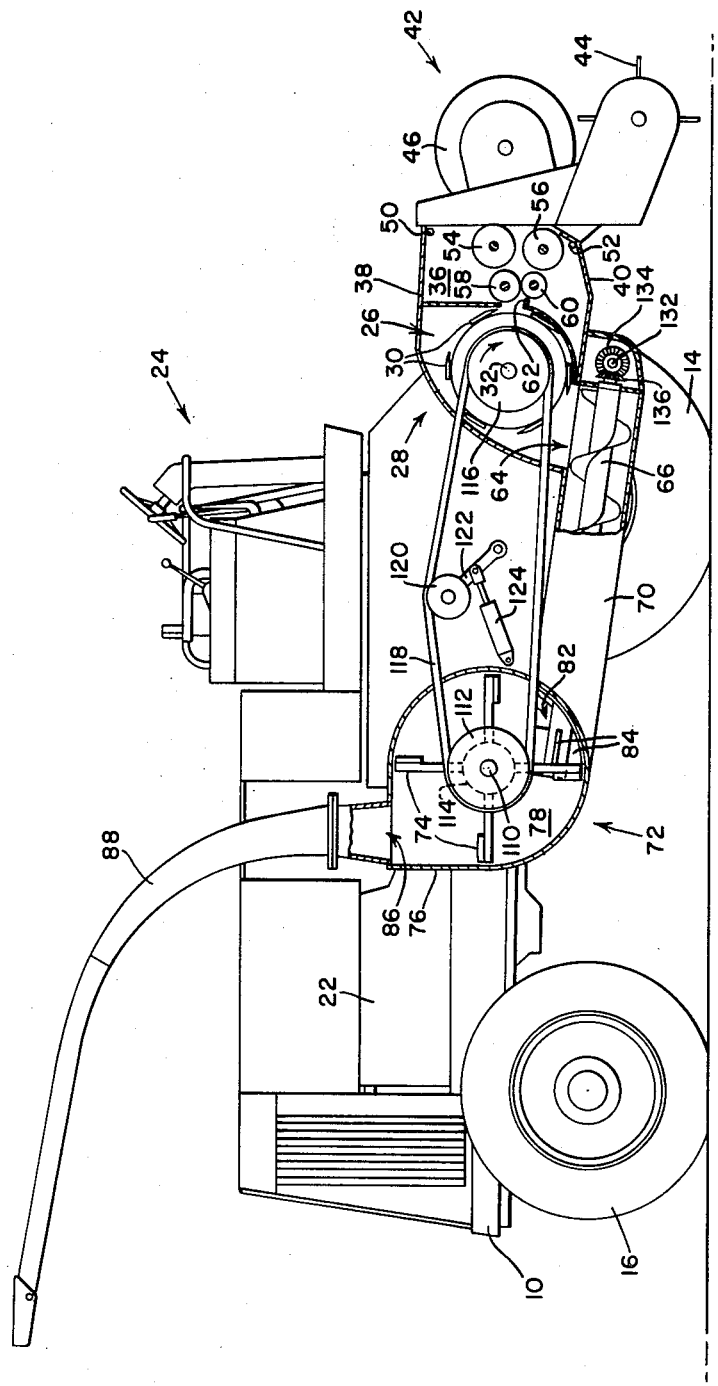
FIG. 1 is a side elevation view of a forage harvester constructed in accordance with the invention, with portions broken away for the sake of clarity; and, FIG. 2 is a plan view of the forage harvester of FIG. 1, with portions broken away to illustrate the invention.

In the ensuing description, right- and left-hand reference is determined by facing the direction of travel of the machine.

The harvesting machine illustrated in the drawings includes a longitudinally extending frame, indicated generally by the numeral 10. A pair of right and left main drive wheels 12 and 14, respectively, are rotatably supported on opposite ends of an axle 16 which, in turn, extends transversely across the front portion of the frame 10. The rear portion of the frame is supported by a right and left pair of steerable wheels 16 and 18, respectively, carried on an axle structure 20. A longitudinally extending engine 22 is mounted on the rear portion of the frame 10 and, as will subsequently appear, furnishes power to drive the front wheels 12 and 14, as well as the various operating components comprising the harvesting mechanism. Situated above and transversely between the wheels 12 and 14 is an operator's platform 24 from which the various functions of the machine are controlled by the operator.

The harvesting mechanism includes a transverse rotary cutterhead 26 mounted forwardly on the frame 10 and enclosed by a housing 28. The cutterhead 26 is of the conventional cylindrical type and comprises a plurality of knives 30 supported on a transverse shaft 32 for rotation therewith. The ends of the shaft 32 extend through and are rotatably supported in spaced vertical sidewalls 34 and 36, which, in conjunction with upper and lower walls 38 and 40, respectively, form the housing 28. The housing 28 opens forwardly to admit crop material thereto.

A conventional header unit, indicated generally by the numeral 42, is mounted on the front of the housing 28 and is operable to pick up crop material from the field and deliver it rearwardly to the housing. The header unit illustrated is of the type used to harvest windrowed hay and comprises, generally, a retractable finger pickup assembly 44 and a transverse feed auger 46 for feeding the crop centrally to an opening 48 in communicating relationship with the interior of the housing 28. The unit 42 is releasably mounted on upper and lower transverse pins 50 and 52 on the sides of the housing 28. It will be apparent to those familiar with the art that other types of header units, such as those adapted to harvest standing row crops, may be substituted for the unit illustrated.

Interposed between the header unit 42 and the cutterhead 26 is a crop feed mechanism comprising an upper and lower front pair of feed rolls 54 and 56, and an upper and lower pair of rear feed rolls 58 and 60. These rolls cooperate to engage and compress the crop material received from the header 42 and feed it rearwardly toward the cutterhead 26.

As the knives 30 on the cutterhead 26 pass a transverse cooperating shearbar 62, a portion is severed from the rear of the mat of crop material fed thereto and is discharged downwardly and rearwardly through a passage 64. The passage 64 communicates with the forward end of a longitudinally extending conveyor assembly, the latter comprising a pair of parallel augers 66 and 68 contained within a housing 70. In operation, the augers 66 and 68 receive the chopped crop material from the cutterhead housing 28, advance it upwardly and rearwardly, and discharge it laterally to a side-mounted blower unit 72. The blower unit 72 comprises a plurality of radially extending fan blades 74 rotatable within a generally cylindrical housing 76. As is apparent from the drawings, the axis of rotation of the blower fan is parallel with that of the cutterhead 26. The blower housing 76 includes generally circular, inner and outer walls 78 and 80, respectively, the inner wall 78 including an opening 82 through which the interior of the conveyor housing 70 communicates with the interior of the blower housing 76. The rearward ends of the auger 66 and 68 are provided with radially extending paddles 84 which are operative to discharge crop material reaching the end of the housing 70 transversely through the opening 82 and into the blower unit housing 76. Inside the housing 76, the crop material is engaged by the fan blades 74 and propelled upwardly through a passage 86 and into a curved discharge spout 88. The spout 88, in turn, directs the material into an adjacent receptacle, conventionally a trailing forage wagon.

Figure 2:
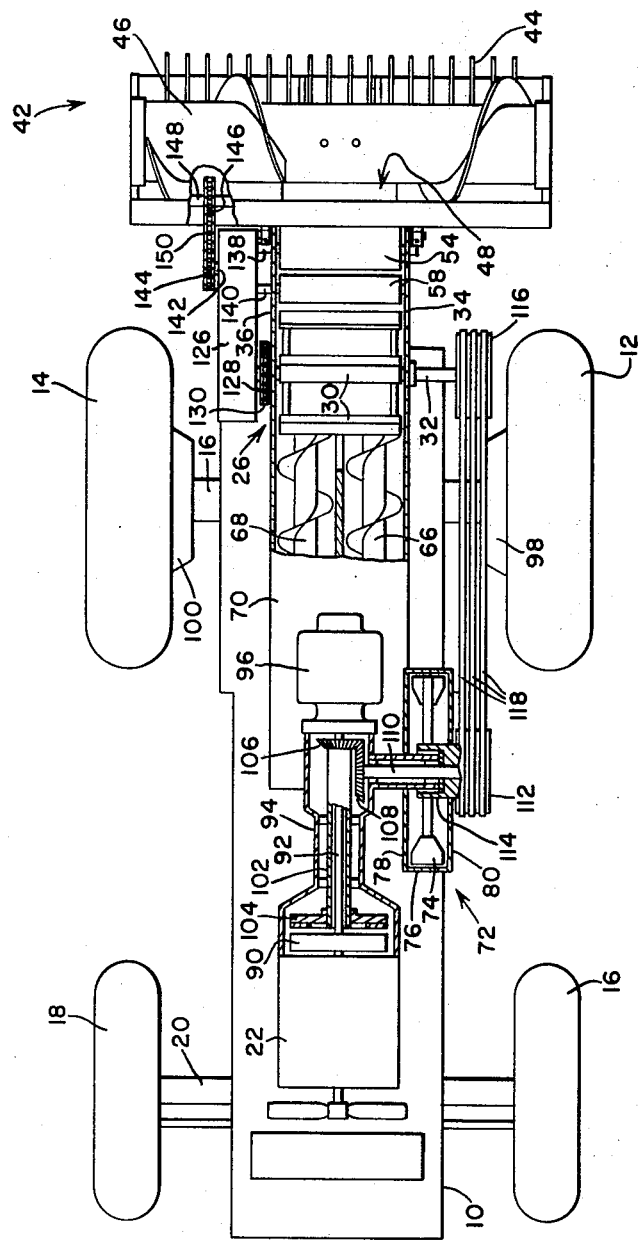

Referring now to FIG. 2, which best illustrates the drive transmission means of the invention, the engine 22 includes a flywheel 90 and an elongated output shaft 92 which extends forwardly through a housing 94 to a propulsion unit 96. In the preferred embodiment, the unit 96 comprises a variable displacement hydraulic pump which supplies fluid under pressure to a pair of hydraulic motors 98 and 100 drivingly connected to the main drive wheels 12 and 14, respectively. Since the engine output shaft 92 is connected directly to the pump 96, the latter is operated whenever the engine is running, and the ground speed of the implement is thus controlled by varying the pump displacement. For purposes of the invention, the propulsion unit 96 could alternatively consist of a conventional clutch and mechanical transmission unit.

The engine output shaft 92 is enclosed throughout substantially its entire length by a hollow, concentrically arranged shaft 102. A clutch mechanism 104 acts between the rearward end of the shaft 102 and the front surface of the flywheel 90 to selectively engage the shaft 102 with the output shaft 92. Unlike the propulsion unit 96, then, the hollow shaft 102 is driven by the engine 22 only when the clutch 104 is engaged, and the harvesting components driven from the shaft 102, to be subsequently described, can thus be engaged with and disengaged from the engine output shaft 92 independently of the propulsion unit 96.

A bevel gear 106 is fixed to the forward end of the hollow shaft 102 and is in driving engagement with a second bevel gear 108 on the inner end of a transverse power shaft 110. The shaft 110 is supported in a lateral extension of the housing 94 and extends through the blower unit housing 76. A multiple grooved sheave 112 is secured to the outer end of the shaft 110 for rotation therewith and includes a cylindrical inner end portion 114 that extends into the blower unit housing 76 and has the fan blades 74 fixed thereto at equal circumferential intervals. The sheave 112 is drivingly connected with a second sheave 116 on the right end of the cutterhead shaft 32 by means of three V-belts 118. An idler sheave 120 (see FIG. 1) mounted on the end of a swingable arm 122 is biased against the upper run of the belts 118 by means of a hydraulic cylinder 124 to maintain the proper tension in the belts during operation of the harvesting mechanism. It will thus be apparent that the transverse shaft 110 serves both as a support shaft for the blower unit fan blades 74 as well as means for transmitting power from the engine output shaft 92 to the cutterhead 26.

The left end of the cutterhead shaft 32 extends through the left wall 36 of the cutterhead housing 28 and comprises the input shaft of a change speed transmission 126. Mounted on the shaft 32 between the outer surface of the wall 36 and the transmission 126 is a sprocket 128 which drives the augers 66 and 68. A roller chain 130 is driven by the sprocket 128 and in turn drives a second sprocket (not shown) fixed to the left end of a shaft 132 extending transversely beneath the cutterhead housing 128 and forwardly of the conveyor housing 70. A pair of bevel gears 134 on the shaft 132 engage bevel gears 136 on the forward ends of the augers 66 and 68 to drive the latter.

The transmission 126 includes a pair of output shafts 138 and 140 which extend through the wall 36 of the housing 28 to drive the feed rolls 54, 56, 58 and 60, and an output shaft 142 to drive the operating components on the header unit 42. A sprocket 144 on the outer end of the shaft 142 is connected to a sprocket 146 on a header unit drive shaft 148 by means of a drive chain 150. The speed ratio between the input shaft 32 and the output shafts 138, 140, and 142 of the transmission 126 may be varied by the operator to drive the header unit and feed rolls at the proper speed for the prevailing crop condition.

I claim:

1. A crop harvesting machine comprising: a longitudinally extending mobile frame; a crop material processing unit mounted forwardly on the frame and including a transverse drive shaft; a blower unit mounted on the frame and including a fan rotatable about an axis generally parallel with and spaced rearwardly from the processing unit drive shaft, said blower unit being operative to receive processed crop material from the processing unit and discharge it to a remote location; an engine mounted on the frame and having a driven output shaft; transverse shaft means drivingly connected to the engine output shaft and having a common rotational axis with said blower unit fan, said fan being connected to and driven by said shaft means; and longitudinally extending endless flexible means drivingly connecting said shaft means with the processing unit drive shaft.

2. The invention defined in claim 1 wherein said transverse shaft means extends into said blower unit and comprises the rotary support means of said blower unit fan.

3. The invention defined in claim 2 wherein said transverse shaft means extends through said blower unit, the portion of said shaft on one side of said blower unit is drivingly connected to the engine output shaft, and said endless flexible means drivingly connects the portion of said shaft on the other side of said blower unit with the processing unit drive shaft.

4. The invention defined in claim 1 including means for selectively disengaging said transverse shaft means from the engine output shaft.

5. The invention defined in claim 1 wherein the processing unit drive shaft includes a portion extending transversely on one side of the processing unit, and including a pair of longitudinally aligned circular drive elements respectively on the transverse shaft means and the processing unit drive shaft portion extending transversely from the processing unit, said circular drive elements being drivingly connected by said endless flexible 6. The invention defined in claim 5 wherein said blower unit includes transversely spaced inner and outer side portions, adjacent to and remote from, respectively, the engine output shaft, said transverse shaft means extends through said blower unit, and the circular drive element on said transverse shaft means is disposed outwardly from the outer side portion of the blower unit.

7. The invention defined in claim 5 further including conveyor means for conveying processed crop material from the processing unit to the blower unit, wherein the processing unit drive shaft includes a portion extending transversely on the other side of the processing unit, and including means drivingly connecting said conveyor means with the processing unit drive shaft portion extending transversely on the other side of the processing unit.

8. The invention defined in claim 5 further including crop feed means mounted forwardly of the processing unit for feeding crop material rearwardly thereto, wherein the processing unit drive shaft includes a portion extending transversely on the other side of the processing unit, and including means drivingly connecting said crop feed means with the processing unit drive shaft portion extending transversely on the other side of the processing unit.

9. The invention defined in claim 8 further including change speed transmission means drivingly interconnecting the processing unit drive shaft with the crop feed means.

10. The invention defined in claim 5 further including header unit means mounted forwardly of the processing unit for gathering crop material from the ground and delivering it rearwardly to the processing unit, wherein the processing unit drive shaft includes a portion extending transversely on the other side of the processing unit, and including means drivingly connecting said header unit means with the processing unit drive shaft portion extending transversely on the other side of the processing unit.

11. The invention defined in claim 10 further including change speed transmission means drivingly interconnecting the processing unit drive shaft with the header unit means.

12. The invention defined in claim 1 wherein the engine output shaft is drivingly connected at its outer end to a propulsion unit, and said transverse shaft means is drivingly connected to the engine output shaft between said engine and said propulsion unit.

13. The invention defined in claim 12 wherein the engine output shaft comprises a pair of concentric, inner and outer shaft members, the inner member being drivingly connected to the propulsion unit and the outer member being selectively engageable and disengageable with the inner member and drivingly connected to the transverse shaft means.

14. A self-propelled forage harvester comprising: a longitudinally extending mobile frame; a cutterhead unit mounted forwardly on the frame and including a transverse drive shaft, said cutterhead unit being operative to reduce crop material fed thereto as the harvester is advanced forwardly; a longitudinally extending engine mounted rearwardly on the frame generally in longitudinal alignment with the cutterhead unit and including a forwardly extending output shaft; a blower unit mounted on the frame longitudinally between the engine and cutterhead unit and transversely toward one side of the frame, said blower unit including a fan rotatable about an axis generally parallel with the cutterhead shaft and being operative to receive reduced crop material from the cutterhead unit and discharge it to a remote location; conveyor means extending longitudinally between said cutterhead unit and said blower unit, said conveyor unit being operative to convey processed crop material from the former to the latter; power shaft means extending transversely through the blower unit and having a common rotational axis with the blower unit fan, said fan being connected to and driven by said power shaft means; means drivingly connecting the transversely inner end of the power shaft means with the engine output shaft; a pair of longitudinally aligned circular drive elements respectively on the transversely outer end of the power shaft means and the cutterhead unit drive shaft; and longitudinally extending endless flexible means drivingly connecting said circular drive elements.

15. The invention defined in claim 14 wherein said engine output shaft extends forwardly to a propulsion unit, and wherein said means drivingly connecting the inner end of the power shaft means with the engine output shaft comprises: a hollow shaft concentric with and enclosing a portion of the engine output shaft between the engine and propulsion units; clutch means for selectively engaging and disengaging said hollow shaft with the engine output shaft; and means drivingly connecting the inner end of the shaft means with said hollow shaft member.

16. A crop harvesting machine comprising: a longitudinally extending mobile frame; a crop material processing unit mounted forwardly on the frame; a blower unit mounted on the frame rearwardly from the processing unit and including a fan rotatable about an axis, said blower unit being operative to receive processed crop material from the processing unit and discharge it to a remote location; an engine mounted on the frame and having a driven output shaft; power shaft means extending through the blower unit and having a common rotational axis with the blower unit fan, said fan being connected to and driven by said power shaft means; means drivingly connecting the end of said power shaft means on one side of the blower unit with the engine output shaft; and means drivingly connecting the end of said power shaft means on the other side of said blower unit with the material processing unit.

* * * * *